(12) United States Patent
Chen (10) Patent No.: US 9,996,469 B2
(45) Date of Patent: Jun. 12, 2018

(54) METHODS FOR PREFETCHING DATA AND APPARATUSES USING THE SAME

(71) Applicant: VIA Alliance Semiconductor Co., Ltd., Shanghai (CN)

(72) Inventor: Chen Chen, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 76 days.

(21) Appl. No.: 15/367,302

(22) Filed: Dec. 2, 2016

(65) Prior Publication Data

US 2018/0121360 A1 May 3, 2018

(30) Foreign Application Priority Data

Oct. 27, 2016 (CN) .......................... 2016 1 0952199

(51) Int. Cl.
*G06F 12/00* (2006.01)
*G06F 12/0862* (2016.01)
*G06F 12/0897* (2016.01)

(52) U.S. Cl.
CPC ...... *G06F 12/0862* (2013.01); *G06F 12/0897* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 6,643,743 B1 * | 11/2003 | Hum .................... | G06F 12/0862 711/134 |
| 2006/0179238 A1 * | 8/2006 | Griswell, Jr. ....... | G06F 9/30043 711/137 |
| 2018/0046578 A1 * | 2/2018 | Liu ...................... | G06F 12/0862 |
| 2018/0052779 A1 * | 2/2018 | McCauley ............. | G06F 12/12 |

\* cited by examiner

*Primary Examiner* — John A Lane
(74) *Attorney, Agent, or Firm* — McClure, Qualey & Rodack, LLP (57) ABSTRACT

The invention introduces a method for prefetching data, which contains at least the following steps: receiving a first read request and a second read request from a first LD/ST (Load/Store) queue and a second LD/ST queue, respectively, in parallel; obtaining a first cache-line number and a first offset from the first read request and a second cache-line number of a second offset from the second read request in parallel; obtaining a third cache-line number from a cache-line number register; obtaining a third offset from an offset register; determining whether an offset trend is formed according to the first to third cache-line numbers and the first to third offsets; and directing an L1 (Level-1) data cache to prefetch data of a cache line when the offset trend is formed.

20 Claims, 4 Drawing Sheets

METHODS FOR PREFETCHING DATA AND APPARATUSES USING THE SAME

CROSS REFERENCE TO RELATED APPLICATIONS

This application claims the benefit of China Patent Application No. 201610952199.7, filed on Oct. 27, 2016, the entirety of which is incorporated by reference herein.

BACKGROUND

Technical Field

The present invention relates to microprocessor, and in particular, to methods for prefetching data and apparatuses using the same.

Description of the Related Art

A microprocessor observes the addresses of recent memory requests and attempts to predict which data will be needed in the future and prefetches the predicted data into a cache memory of the microprocessor in order to avoid the relatively long latency associated with access to system memory that is required when a cache miss occurs. It is easy to predict what data will be needed in the future by observing a simple sequence of memory accesses. However, programs also access data in patterns that are more complex than a simple sequential pattern. In order to increase the execution efficiency of LD/ST (load/store), some microprocessors install two or more LD/ST pipelines. Observing complex access patterns in two LD/ST pipelines is increasingly complex. Designing a data prefetcher to predict future-needed data for complex access patterns in two LD/ST pipelines may require significant power and timing resources, thereby negatively affecting clock cycle lengths and power consumption of modern microprocessors, both of which are important concerns. Therefore, what is needed is an efficient data prefetcher for predicting complex access patterns in two LD/ST pipelines.

BRIEF SUMMARY

An embodiment of the invention introduces a method for prefetching data, which contains at least the following steps: receiving a first read request and a second read request from a first LD/ST (Load/Store) queue and a second LD/ST queue, respectively, in parallel; obtaining a first cache-line number and a first offset from the first read request and a second cache-line number of a second offset from the second read request in parallel; obtaining a third cache-line number from a cache-line number register; obtaining a third offset from an offset register; determining whether an offset trend is formed according to the first to third cache-line numbers and the first to third offsets; and directing an L1 (Level-1) data cache to prefetch data of a cache line when the offset trend is formed.

An embodiment of the invention introduces an apparatus for prefetching data, at least containing: a first LD/ST queue; a second LD/ST queue; an L1 data cache; and a detector. The detector, coupled to the first LD/ST queue, the second LD/ST queue and the L1 data cache, receives a first read request and a second read request from the first LD/ST queue and the second LD/ST queue, respectively, in parallel; obtains a first cache-line number and a first offset from the first read request and a second cache-line number of a second offset from the second read request in parallel; obtains a third cache-line number from a cache-line number register; obtains a third offset from an offset register; determines whether an offset trend is formed according to the first to third cache-line numbers and the first to third offsets; and directs the L1 data cache to prefetch data of a cache line when the offset trend is formed.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
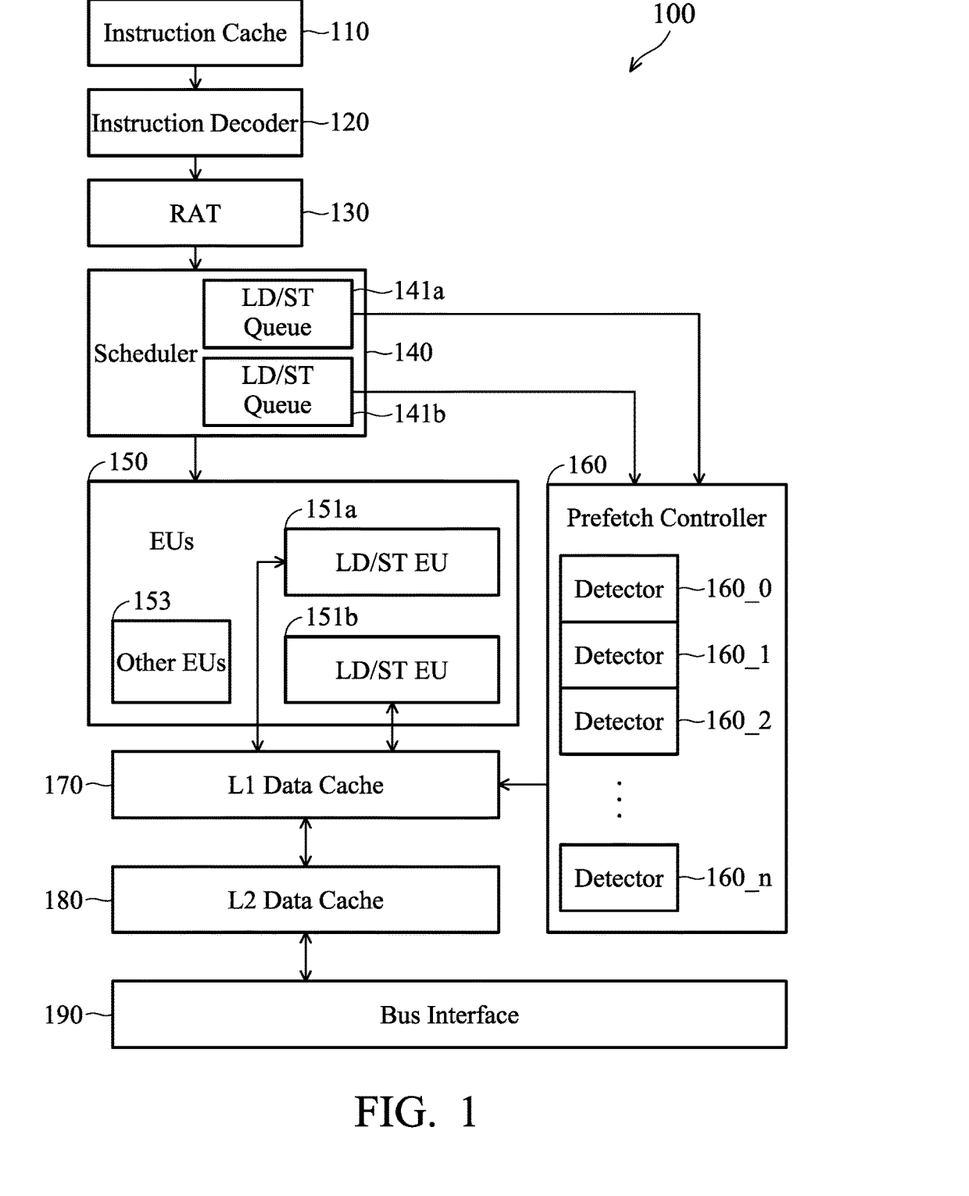
FIG. 1 is a block diagram of a superscalar and pipelined microprocessor according to one embodiment of the present invention.

FIG. 1 is a block diagram of a superscalar and pipelined microprocessor according to one embodiment of the present invention. The microprocessor 100 includes an instruction cache 110 that caches macroinstructions of an instruction set architecture, such as the x86 instruction set architecture or the like. Additional or alternative instruction set architectures are contemplated. An instruction decoder 120 receives the macroinstructions from the instruction cache 110 and translates the macroinstructions into microinstructions. The microinstructions are then provided to a RAT (register alias table) 130, which generates microinstruction dependencies and issues the microinstructions in program order to a scheduler 140. The scheduler 140, such as a reservation station, dispatches one microinstruction to the proper one of the EUs (execution units) 150, and the scheduler 140 contains LD/ST (Load/Store) queues 141a and 141b for dispatching load requests to the LD/ST EUs (Execution Units) 151a and 151b in parallel. In addition to the LD/ST EUs 151a and 151b, the EU 150 may contain one or more other EUs 153. Any of the other EUs 153 may be an integer ALU (Arithmetic/logic unit), a floating-point EU, a branch unit, a SIMD (single-instruction-multiple-data) EU, or the like. Any of the LD/ST EUs 151a and 151b reads data from an L1 (Level-1) data cache 170 and stores data in the L1 data cache 170. An L2 (Level-2) data cache 180 is installed after the L1 data cache 170 and the instruction cache 110. The L2 data cache 180 reads data from a system memory and writes data in the system memory through a bus interface 190. The bus interface 190 connects the microprocessor 100 to a bus, such as a local bus, a memory bus, or the like. A prefetch controller 160 is coupled to the LD/ST EUs 151a and 151b, the L1 data cache 170, the L2 data cache 180 and the bus interface 190. The prefetch controller 160 may prefetch data from the L2 data cache 180 and store the data in the L1 data cache 170. The prefetch controller 160 contains multiple detectors 160_0 to 160_n, wherein n is an integer and can be modified depending on different design requirements. To sum up, any of the detectors 160_0 to 160_n can perform the following functions: receiving a first read request and a second read request from the LD/ST queue 141a and the LD/ST queue 141b, respectively, in parallel; obtaining a first cache-line number and a first offset from the first read request and a second cache-line number of a second offset from the second read request in parallel; obtaining a third cache-line number from a cache-line number register; obtaining a third offset from an offset register; determining whether an offset trend is formed according to the first to third cache-line numbers and the first to third offsets; and directing the L1 data cache 170 to prefetch data of a cache line when the offset trend is formed.

Figure 2:
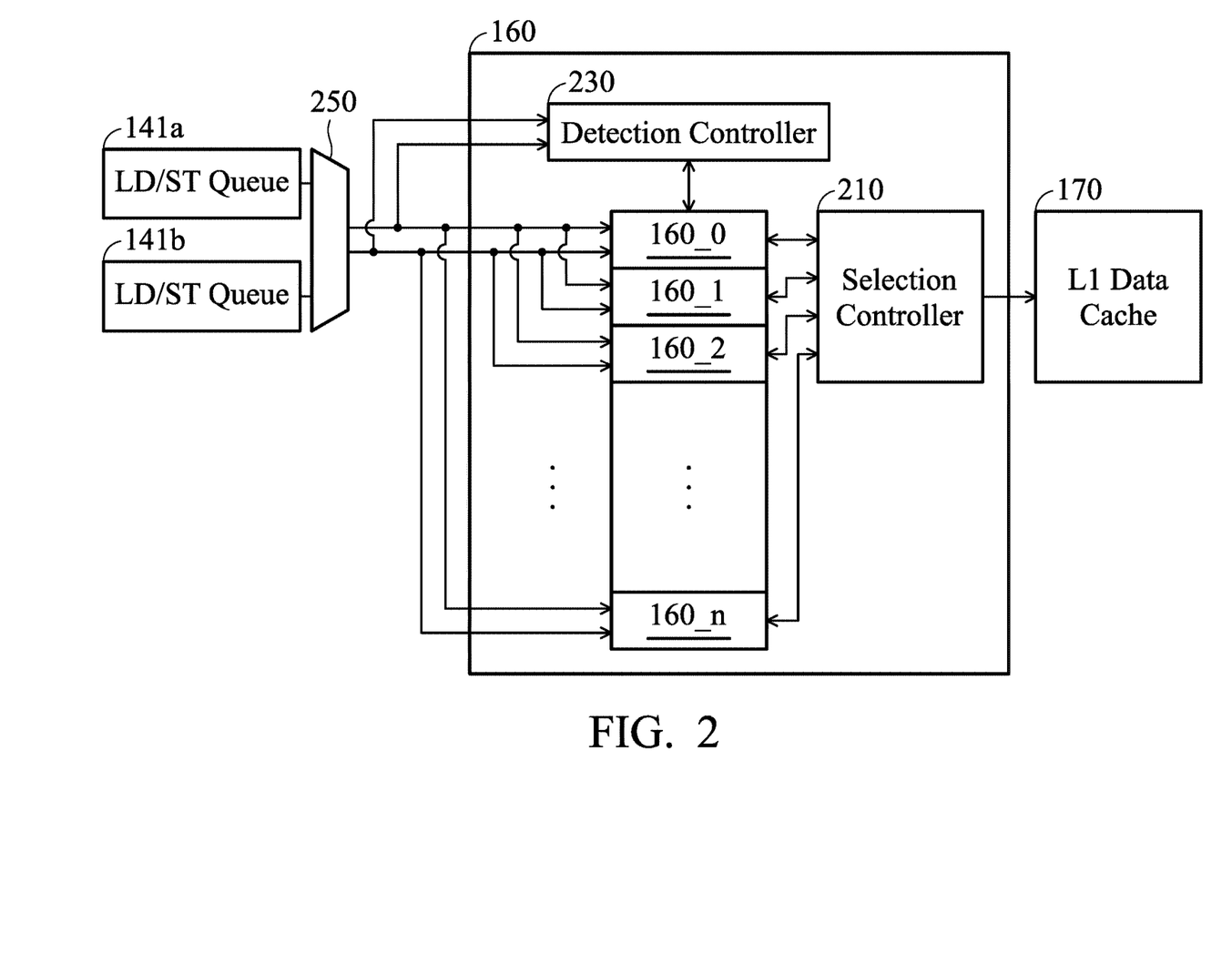
FIG. 2 is a system block diagram of a prefetch controller according to an embodiment of the invention.

FIG. 2 is a system block diagram of a prefetch controller according to an embodiment of the invention. Any of the detectors 160_0 to 160_n obtains load addresses of read addresses from the LD/ST queues 141a and 141b, respectively, determines whether each of cache-line numbers of load addresses of two read requests (e.g. the aforementioned first and second cache-line numbers) matches a cache-line number associated with this detector (e.g. the aforementioned third cache-line number), and determines whether an offset ascending/descending trend is formed by considering offsets of the load addresses of the read requests (e.g. the aforementioned first and second offsets) and an offset of the prior read request (e.g. the aforementioned third offset). If so, a control signal is issued to a selection controller 210 for directing the L1 data cache 170 to prefetch data of the designated cache line. The prefetch controller 160 further contains a detection controller 230. The detection controller 230 monitors determination results of the detectors 160_0 to 160_n and determines whether the cache-line number (e.g. the aforementioned first cache-line number) of the load address of the read request from the LD/ST queue 141a does not match (i.e. does not equal) any cache-line number of the detectors 160_0 to 160_n. If so, the detection controller 230 selects a detector associated with the oldest cache-line number (that is, with the earliest entered cache line) from the detectors 160_0 to 160_n according to an LRU (Least Recently Used) algorithm, and directs the selected detector to manage the cache line associated with this load address. For example, the cache-line number associated with the selected detector is updated with the cache-line number (e.g. the aforementioned first cache-line number) of the load address of the read request from the LD/ST queue 141a at the current clock cycle. The detection controller 230 further determines whether the cache-line number (e.g. the aforementioned second cache-line number) of the load address of the read request from the LD/ST queue 141b does not match (i.e. does not equal) any cache-line number of the detectors 160_0 to 160_n. If so, except for the selected detector, the detection controller 230 selects a detector associated with the second oldest cache-line number from the detectors 160_0 to 160_n, and updates the cache-line number associated with the selected detector with the cache-line number (e.g. the aforementioned second cache-line number) of the load address of the read request from the LD/ST queue 141b at the current clock cycle.

Figure 3:
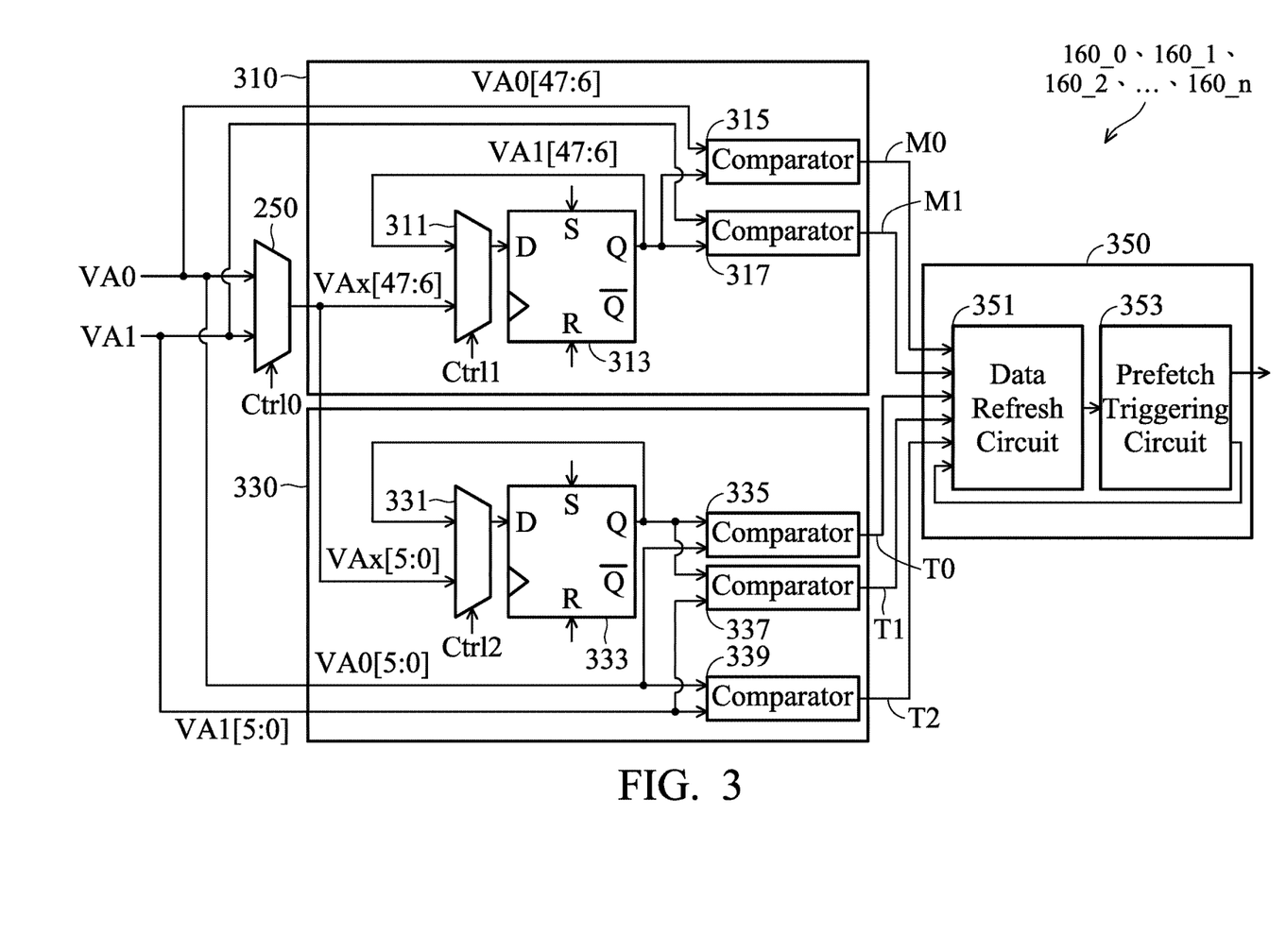
FIG. 3 is a system block diagram of a detector according to an embodiment of the invention.

FIG. 3 is a system block diagram of a detector according to an embodiment of the invention. Each of the detectors 160_0 to 160_n contains a cache-line detection unit 310, an offset detection unit 330 and a trend detection unit 350. The cache-line detection unit 310 and the offset detection unit 330 respectively obtain cache-line numbers and offsets of load addresses VA0 and VA1 of read requests and perform the determinations described below. Data of the L1 data cache 170 is stored in cache-lines. Normally, a data length requested by each read request to the L1 data cache 170, which is dispatched from the LD/ST queue 141a or 141b, does not exceed the length of one cache-line. For example, load addresses VA0 and VA1 may be represented in 48 bits, in which [47:6] (referred to as the $6^{th}$ to $47^{th}$ bits) indicate a cache-line number and [5:0] (referred to as the $0^{th}$ to $5^{th}$ bits) indicate an offset of the cache line associated with the cache-line number.

In an embodiment, the cache-line detection unit 310 contains a cache-line number register 313 practiced in a D flip-flop register for latching a cache-line number. It is indicated that a detector is in an available state when its cache-line number register 313 latches a cache-line number of a cache line. The latched cache-line number corresponds to a cache line corresponding to a load address requested by a read request that occupied the detector at first (before the current clock cycle). That is, there was a read request mapped to the detector. It is indicated that a detector is in an unavailable state when its cache-line number register 313 latches nothing or a null value. The cache-line number register 313 latching nothing or a null value may be referred to as an empty cache-line number register and indicates that the corresponding detector has not been occupied. The cache-line number register 313 may be disposed outside of the cache-line detection unit 310 and the invention should not be limited thereto. The cache-line detection unit 310 contains comparators 315 and 317 for determining whether two load addresses fall within the corresponding cache line. The comparator 315 determines whether the cache-line number of the load address VA0[47:6] equals the cache-line number of the cache-line number register 313 and outputs a result M0. If so, the output result M0 is 1. Otherwise, the output result M0 is 0. The comparator 317 determines whether the cache-line number of the load address VA1[47:6] equals the cache-line number of the cache-line number register 313 and outputs a result M1. If so, the output result M1 is 1. Otherwise, the output result M1 is 0. The detection controller 230 monitors the output results M0 and M1 of all detectors 160_0 to 160_n. When all output results M0 of the cache-line number detection units 310 of the detectors 160_0 to 160_n are 0s, it is indicated that the cache-line number of the load address dispatched from the LD/ST queue 141a at the current clock cycle does not equal all cache-line numbers of valid detectors. If no invalid detector is presented (i.e. all detectors are occupied), then the detection controller 230 selects a detector from the detectors 160_0 to 160_*n*, that is associated with the earliest entered cache line (i.e. the oldest latched cache-line number), issues a control signal Ctrl0 to a multiplexer 250 to connect the LD/ST queue 141*a* to a multiplexer 311 of the selected detector for transmitting the cache-line number VA0[47:6] of the load address to the multiplexer 311 of the selected detector. Meanwhile, the detection controller 230 issues a control signal Ctrl1 to the multiplexer 311 of the selected detector to connect the multiplexer 250 to the cache-line number register 313 of the selected detector for transmitting the cache-line number VA0[47:6] of the load address to the cache-line number register 313 of the selected detector, thereby enabling the cache-line number register 313 to latch the cache-line number VA0[47:6] of the load address. As a result, the cache-line number associated with the selected detector is updated with the cache-line number of the load address of the read request dispatched from the LD/ST queue 141*a*. When the all output results M1 of the cache-line number detection units 310 of the detectors 160_0 to 160_*n* are 0s, it is indicated that the cache-line number of the load address dispatched from the LD/ST queue 141*b* at the current clock cycle does not equal any of cache-line numbers of valid detectors. If no invalid detector is present (i.e. all detectors are occupied), then the detection controller 230 selects a detector from the detectors 160_0 to 160_*n*, that is associated with the earliest entered cache line (i.e. the oldest latched cache-line number). If all output results M0 and M1 of the detectors 160_0 to 160_*n* are 0s and no invalid detector is present, then the detection controller 230 selects a detector from the detectors 160_0 to 160_*n*, that is associated with the second-earliest entered cache line (i.e. the second-oldest latched cache-line number). After that, the detection controller 230 issues a control signal Ctrl0 to the multiplexer 250 to connect the LD/ST queue 141*b* to the multiplexer 311 of the selected detector for transmitting the cache-line number VA1[47:6] of the load address to the multiplexer 311 of the selected detector. Meanwhile, the detection controller 230 issues a control signal Ctrl1 to the multiplexer 311 of the selected detector to connect the multiplexer 250 to the cache-line number register 313 of the selected detector for transmitting the cache-line number VA1[47:6] of the load address to the cache-line number register 313 of the selected detector, thereby enabling the cache-line number register 313 to latch the cache-line number VA1[47:6] of the load address. As a result, the cache-line number associated with the selected detector is updated with the cache-line number of the load address of the read request dispatched from the LD/ST queue 141*b*.

The offset detection unit 330 contains an offset register 333 practiced in a D flip-flop register for latching an offset. The offset register 333 may be disposed outside of the offset detection unit 330 and the invention should not be limited thereto. The offset detection unit 330 contains comparators 335, 337 and 339. The comparator 335 compares the offset VA0[5:0] of the load address VA0 of the read request dispatched from the LD/ST queue 141*a* with the offset of the offset register 333 and outputs a result T0. If the offset VA0[5:0] of the load address VA0 is greater than the offset of the offset register 333, the output result T0 is 1. Otherwise, the output result T0 is 0. The comparator 337 compares the offset VA1[5:0] of the load address VA1 of the read request dispatched from the LD/ST queue 141*b* with the offset of the offset register 333 and outputs a result T1. If the offset VA1[5:0] of the load address VA1 is greater than the offset of the offset register 333, the output result T1 is 1. Otherwise, the output result T1 is 0. The comparator 339 compares the offset VA0[5:0] of the load address VA1 with the offset VA1[5:0] of the load address VA1 and outputs a result T2. If the offset VA0[5:0] of the load address VA0 is greater than the offset VA1[5:0] of the load address VAL the output result T2 is 1. If the offset VA0[5:0] of the load address VA0 is less than the offset VA1[5:0] of the load address VAL the output result T2 is 0. Additionally, a data refresh circuit 351 of each trend detection unit 350 monitors the output results M0, M1, T0, T1 and T2. When M0 is 1 and M1 is 0, the data refresh circuit 351 issues a control signal Ctrl0 to the multiplexer 250 to connect the LD/ST queue 141*a* to the multiplexer 331 for transmitting the offset VA0[5:0] of the load address VA0 to the multiplexer 331 and issues a control signal Ctrl2 to the multiplexer 331 to connect the multiplexer 250 to the offset register 333 for transmitting the offset VA0[5:0] of the load address VA0 to the offset register 333, thereby enabling the offset register 333 to latch the offset VA0[5:0] of the load address VA0. That is, the aforementioned third offset associated with this detector is updated with the offset of the read request dispatched from the LD/ST queue 141*a* at the current clock cycle (e.g. the aforementioned first offset). When M0 is 0 and M1 is 1, the data refresh circuit 351 issues a control signal Ctrl0 to the multiplexer 250 to connect the LD/ST queue 141*b* to the multiplexer 331 for transmitting the offset VA1[5:0] of the load address VA1 to the multiplexer 331 and issues a control signal Ctrl2 to the multiplexer 331 to connect the multiplexer 250 to the offset register 333 for transmitting the offset VA1[5:0] of the load address VA1 to the offset register 333, thereby enabling the offset register 333 to latch the offset VA1[5:0] of the load address VA1. That is, the aforementioned third offset associated with this detector is updated with the offset of the read request dispatched from the LD/ST queue 141*b* at the current clock cycle (e.g. the aforementioned second offset). When M0 is 1, M1 is 1, T0 and T1 are 1s, and T2 is 1 (that is, an offset ascending is formed and the offset VA0[5:0] of the load address VA0 is the greatest), the data refresh circuit 351 issues control signals Ctrl0 and Ctrl1 to the multiplexers 250 and 331, respectively, enabling the offset register 333 to latch the offset VA0[5:0] of the load address VA0 as the aforementioned third offset. When M0 is 1, M1 is 1, T0 and T1 are 1s, and T2 is 0 (that is, an offset ascending is formed and the offset VA1[5:0] of the load address VA1 is the greatest), the data refresh circuit 351 issues control signals Ctrl0 and Ctrl1 to the multiplexers 250 and 331, respectively, enabling the offset register 333 to latch the offset VA1[5:0] of the load address VA1 as the aforementioned third offset. When M0 is 1, M1 is 1, T0 and T1 are 0s, and T2 is 1 (that is, an offset descending is formed and the offset VA1[5:0] of the load address VA1 is the least), the data refresh circuit 351 issues control signals Ctrl0 and Ctrl1 to the multiplexers 250 and 331, respectively, enabling the offset register 333 to latch the offset VA1[5:0] of the load address VA1 as the aforementioned third offset. When M0 is 1, M1 is 1, T0 and T1 are 0s, and T2 is 0 (that is, an offset descending is formed and the offset VA0[5:0] of the load address VA0 is the least), the data refresh circuit 351 issues control signals Ctrl0 and Ctrl1 to the multiplexers 250 and 331, respectively, enabling the offset register 333 to latch the offset VA0[5:0] of the load address VA0 as the aforementioned third offset. In some embodiments, each detector may contain another offset register (not shown) for latching a fourth offset that is the less one of the offsets VA0[5:0] and VA1[5:0] when an offset ascending is formed, or the greater one of the offsets VA0[5:0] and VA1[5:0] when an offset descending is formed. How the fourth offset works will be described below.

In some embodiments, the offset register 333 may determine the time order of read requests according to their ROB (ReOrder Buffer) indexes, where a greater ROB index represents a later read request than the others with less ones. The comparators 335, 337 and 339 may obtain ROB indexes of the read requests dispatched from the LD/ST queues 141a and 141b and determine the order of the two read requests dispatched at the same clock cycle accordingly. The load address with the greater ROB index is considered as VA0 while the load address with the less ROB index is considered as VA1. After that, the aforementioned comparisons are performed to produce output results T0 to T2. That is, values of ROB indexes, or the similar indicates the time order of the two read requests dispatched at the same clock cycle, the later-entered load address is VA0 and the earlier-entered load address is VA1. Then, it is determined whether the offsets of two read requests dispatched at the current clock cycle joining the offset of previous read request form an offset ascending or descending. In some embodiments, no time order is taken into account for two read requests dispatched at the same clock cycle.

The data refresh circuit 351 of each trend detection unit 350 further contains two trend counters. An ascending counter indicates detected times of offset ascending and a descending counter indicates detected times of offset descending. The ascending and descending counters may be disposed outside of the data refresh circuit 351 and the invention should not be limited thereto. The data refresh circuit 351 updates the two trend counters according to output results M0 and M1 of the cache-line detection unit 310 and output results T0 and T1 of the offset detection unit 330. The data refresh circuit 351 may update the two trend counters according to exemplary cases as shown in Table 1. The trend detection unit 350 may contain a non-volatile memory, such as a SRAM (Static Random Access Memory), a flash memory, etc., to store the content of Table 1.

TABLE 1

| Cases | M0 | M1 | T0 | T1 | Trend counter | Initial Count | Resulting Count |
|---|---|---|---|---|---|---|---|
| 1 | 1 | 0 | 1 | — | Ascending | i | i + 1 |
| 2 | 0 | 1 | — | 1 | Ascending | i | i + 1 |
| 3 | 1 | 0 | 0 | — | Descending | i | i + 1 |
| 4 | 0 | 1 | — | 0 | Descending | i | i + 1 |
| 5 | 1 | 1 | 0 | 1 | None | None | None |
| 6 | 1 | 1 | 1 | 0 | None | None | None |
| 7 | 1 | 1 | 1 | 1 | Ascending | i | i + 2 |
| 8 | 1 | 1 | 0 | 0 | Descending | i | i + 2 |

The $2^{nd}$ to $7^{th}$ columns are input parameters and the $8^{th}$ column is the output result. The $2^{nd}$ to $5^{th}$ columns record output results M0, M1, T0 and T1, respectively. The $6^{th}$ column records which counter is updated. The $7^{th}$ column records initial count of the counter indicated by the $6^{th}$ column. The $8^{th}$ column records resulting values of the counter indicated by the $6^{th}$ column. The symbols "—" appearing in the columns "T0" and "T1" indicate that the values do not affect the resulting values of the counter and are not taken into account. The data refresh circuit 351 searches for a proper case by comparing the values appearing in the $2^{nd}$ to $5^{th}$ columns with the output results M0 and M1 of the cache-line detection unit 310 and the output results T0 and T1 of the offset detection unit 330 and updates a designated counter according to information recorded in the $6^{th}$ to $8^{th}$ columns of the searched case. "i+1" and "i+2" appearing in the column "Resulting Count" instructs the data refresh circuit 351 to increase the value of the designated counter by one and two, respectively. It should be noted that the rules for updating counters as shown in Table 1 are examples, and the invention should not be limited thereto.

A prefetch triggering circuit 353 of each trend detection unit 350 reads the values of the trend counters and accordingly determines whether to trigger a prefetch. Specifically, when detecting that the count of the ascending counter reaches a predefined threshold, such as 3, the prefetch triggering circuit 353 issues a control signal to a selection controller 210 for directing the L1 data cache 170 to prefetch data of the next cache-line. The above situation indicates that an offset ascending is formed. When detecting that the count of the descending counter reaches a predefined threshold, such as 3, the prefetch triggering circuit 353 issues a control signal to the selection controller 210 for directing the L1 data cache 170 to prefetch data of the prior cache-line. The above situation indicates that an offset descending is formed. For example, if the cache-line number of the cache-line number register 313 is 10, then the next cache-line number is 11 and the prior cache-line number is 9.

The embodiments do not inspect whether the read requests form a continuous offset ascending or descending restrictively, thus, four or more read requests should be detected to ensure their offset trend. Other embodiments may detect three consequent read requests instead. The third offset stored in the corresponding detector is the offset of the read request dispatched from the LD/ST queue 141a or 141b at the prior clock cycle. When detecting that the output results M0 and M1 of the cache-line detection unit 310 are is (that is, the aforementioned first and second cache-line numbers hit the third cache-line number stored in the prefetch controller 160), the output results T0 and T1 of the offset detection unit 330 are is and the output result T2 of the offset detection unit 330 is 0 or 1 (that is, the aforementioned first and second offsets are different and greater than the third offset stored in the corresponding detector), the trend detection unit 350 determines that an offset ascending is formed. When detecting that the output results M0 and M1 of the cache-line detection unit 310 are is (that is, the aforementioned first and second cache-line numbers hit the third cache-line number stored in the corresponding detector), the output results T0 and T1 of the offset detection unit 330 are 0s and the output result T2 of the offset detection unit 330 is 0 or 1 (that is, the aforementioned first and second offsets are different and less than the third offset stored in the corresponding detector), the trend detection unit 350 determines that an offset descending is formed.

Other embodiments may record two offsets of the prior read requests (that is, the aforementioned third and fourth offsets). If the less one of the offsets of the two read requests dispatched at the current clock cycle is greater than the greater one of the third and fourth offsets stored in the corresponding detector, then the trend detection unit 350 determines that an offset ascending is formed. If the greater one of the offsets of the two read requests dispatched at the current clock cycle is less than the less one of the third and fourth offsets stored in the corresponding detector, then the trend detection unit 350 determines that an offset descending is formed.

Figure 4:
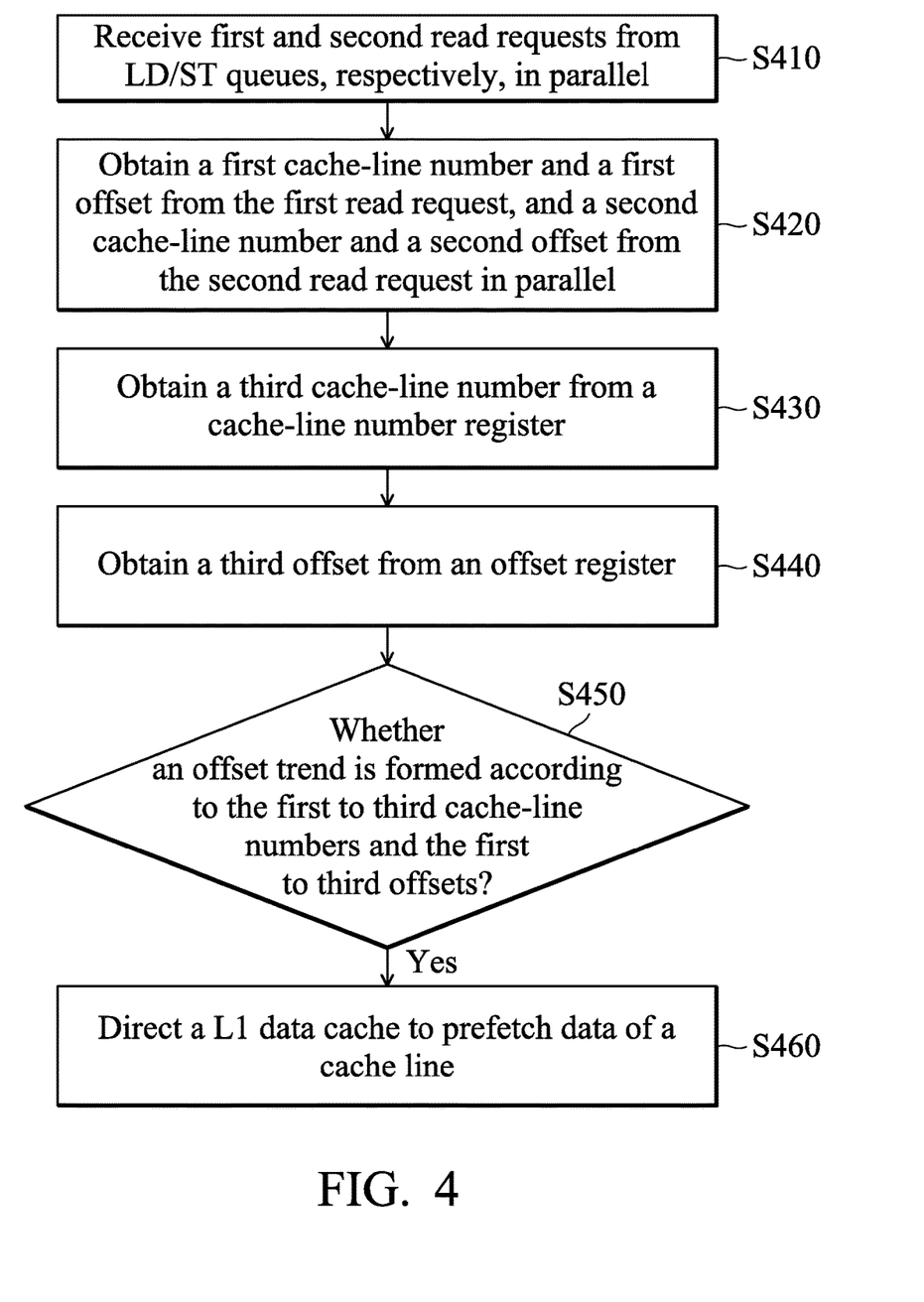
FIG. 4 is a flowchart illustrating a method for prefetching data according to an embodiment of the invention.

FIG. 4 is a flowchart illustrating a method for prefetching data according to an embodiment of the invention. After a predefined period of time, first and second read requests are received from the LD/ST queues 141a and 141b, respectively, in parallel (step S410), a first cache-line number and a first offset are obtained from the first read request and a second cache-line number and a second offset are obtained from the second read request in parallel (step S420). A third cache-line number is obtained from a cache-line number register (step S430) and a third offset is obtained from an offset register (step S440). It is determined whether an offset trend is formed according to the first to third cache-line numbers and the first to third offsets (step S450). For details of step S450, refer to the descriptions of the data refresh circuit 351 and the prefetch triggering circuit 353. When an offset trend is formed (the "Yes" path of step S450), the L1 data cache 170 is directed to prefetch data of a cache line (step S460). Otherwise, the two read requests are omitted.

In step S450, when the first and second cache-line numbers equal the third cache-line number and the first and second offsets are different and greater than the third offset, it is determined that an offset ascending is formed. When the first and second cache-line numbers equal the third cache-line number and the first and second offsets are different and less than the third offset, it is determined that an offset descending is formed. In alternative embodiments of step S450, when the first cache-line number is the same as the third cache-line number and the first offset is greater than the third offset, the value of the ascending counter is increased by one. When the second cache-line number is the same as the third cache-line number and the second offset is greater than the third offset, the value of the ascending counter is increased by one. If the resulting value of the ascending counter is greater than a threshold, then an offset ascending is formed. When the first cache-line number is the same as the third cache-line number and the first offset is less than the third offset, the value of the descending counter is increased by one. When the second cache-line number is the same as the third cache-line number and the second offset is less than the third offset, the value of the descending counter is increased by one. If the resulting value of descending counter is greater than a threshold, then an offset descending is formed.

In step S460, when an offset ascending is formed, the L1 data cache 170 is directed to prefetch data of the next cache line. When an offset descending is formed, the L1 data cache 170 is directed to prefetch data of the prior cache line.

Several scenarios are introduced to describe the operations of the prefetch controller 160. Assume that the detectors 160_0 to 160_n are initiated to unavailable states:

In a first scenario, the detector 160_0 receives load addresses A/3 and A/7 of two read requests from the LD/ST queues 141a and 141b at a first moment in parallel and receives load addresses A/4 and A/5 of two read requests from the LD/ST queues 141a and 141b at a second moment in parallel, where the letters before the slash represent cache-line numbers and the numbers after the slash represent offsets. Since the load addresses at the second moment joining the load addresses at the first moment do not form an offset trend, a prefetch is not triggered.

In a second scenario, the detector 160_0 receives load addresses A/3 and A/4 of two read requests from the LD/ST queues 141a and 141b at a first moment in parallel and receives load addresses A/6 and A/5 of two read requests from the LD/ST queues 141a and 141b at a second moment in parallel. Since the load addresses at the second moment joining the load addresses at the first moment form an offset ascending, a control signal is issued to the selection controller 210 for directing the L1 data cache 170 to prefetch data of a cache line numbered by (A+1).

In a third scenario, the detector 160_0 receives load addresses A/5 and A/6 of two read requests from the LD/ST queues 141a and 141b at a first moment in parallel and receives load addresses A/3 and A/4 of two read requests from the LD/ST queues 141a and 141b at a second moment in parallel. Since the load addresses at the second moment joining the load addresses at the first moment form an offset descending, a control signal is issued to the selection controller 210 for directing the L1 data cache 170 to prefetch data of a cache line numbered by (A−1).

In the second and third scenarios, in each iteration, the embodiments of the invention can track address variations of LD/ST queues of two LD/ST pipelines simultaneously, determine whether read requests dispatched from two LD/ST queues in parallel joining the prior read requests form an offset trend, such as an offset ascending or descending, and accordingly trigger prefetch operations, thereby enabling the hit rate of data read from the L1 data cache 170 to be improved.

Although the embodiment has been described as having specific elements in FIGS. 1 to 3, it should be noted that additional elements may be included to achieve better performance without departing from the spirit of the invention. While the process flows described in FIG. 4 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for prefetching data, comprising:
receiving a first read request and a second read request from a first LD/ST (Load/Store) queue and a second LD/ST queue, respectively, in parallel;
obtaining a first cache-line number and a first offset from the first read request and a second cache-line number of a second offset from the second read request in parallel;
obtaining a third cache-line number from a cache-line number register;
obtaining a third offset from an offset register;
determining whether an offset trend is formed according to the first to third cache-line numbers and the first to third offsets; and
directing an L1 (Level-1) data cache to prefetch data of a cache line when the offset trend is formed.

2. The method of claim 1, wherein the first read request requests to read data of a first load address, the second read request requests to read data of a second load address, the first load address comprises the first cache-line number, and the second load address comprises the second cache-line number.

3. The method of claim 1, wherein the first read request requests to read data of a first load address, the second read request requests to read data of a second load address, the first offset of the first load address is an address offset on a first cache line corresponding to the first cache-line number and the second offset of the second load address is an address offset on a second cache line corresponding to the second cache-line number.

4. The method of claim 1, wherein first and second read requests are dispatched from the first and second LD/ST queues, respectively, at a current clock cycle, and the third offset corresponds to a third read request dispatched from the first or second LD/ST queue at a clock cycle prior to the current clock cycle.

5. The method of claim 1, wherein a first ROB (ReOrder Buffer) index of the first read request is greater than a second ROB index of the second read request.

6. The method of claim 1, wherein the step of determining whether an offset trend is formed according to the first to third cache-line numbers and the first to third offsets comprises:
when the first cache-line number and the second cache-line number equal the third cache-line number, and the first and second offsets are different and greater than the third offset, determining that an offset ascending is formed; and
when the first cache-line number and the second cache-line number equal the third cache-line number, and the first and second offsets are different and less than the third offset, determining that an offset descending is formed.

7. The method of claim 6, wherein the step of directing an L1 (Level-1) data cache to prefetch data of a cache line when the offset trend is formed, comprises:
when the offset ascending is formed, directing the L1 data cache to prefetch data of the next cache line; and
when the offset descending is formed, directing the L1 data cache to prefetch data of the prior cache line.

8. The method of claim 1, wherein the step of determining whether an offset trend is formed according to the first to third cache-line numbers and the first to third offsets comprises:
when the first cache-line number equals the third cache-line number and the first offset is greater than the third offset, increasing a count of a first trend counter by one;
when the second cache-line number equals the third cache-line number and the second offset is greater than the third offset, increasing the count of the first trend counter by one;
when the count of the first trend counter is greater than a first threshold, determining that an offset ascending is formed;
when the first cache-line number equals the third cache-line number and the first offset is less than the third offset, increasing a count of a second trend counter by one;
when the second cache-line number equals the third cache-line number and the second offset is less than the third offset, increasing the count of the second trend counter by one; and
when the count of the second trend counter is greater than a second threshold, determining that an offset descending is formed.

9. An apparatus for prefetching data, comprising:
a first LD/ST (Load/Store) queue;
a second LD/ST queue;
an L1 (Level-1) data cache; and
a detector, coupled to the first LD/ST queue, the second LD/ST queue and the L1 data cache, receiving a first read request and a second read request from the first LD/ST queue and the second LD/ST queue, respectively, in parallel; obtaining a first cache-line number and a first offset from the first read request and a second cache-line number of a second offset from the second read request in parallel; obtaining a third cache-line number from a cache-line number register; obtaining a third offset from an offset register; determining whether an offset trend is formed according to the first to third cache-line numbers and the first to third offsets; and directing the L1 data cache to prefetch data of a cache line when the offset trend is formed.

10. The apparatus of claim 9, wherein the detector determines that an offset ascending is formed when the first cache-line number and the second cache-line number equal the third cache-line number, and the first and second offsets are different and greater than the third offset; and determines that an offset descending is formed when the first cache-line number and the second cache-line number equal the third cache-line number, and the first and second offsets are different and less than the third offset.

11. The apparatus of claim 10, wherein the detector directs the L1 data cache to prefetch data of the next cache line when the offset ascending is formed; and directs the L1 data cache to prefetch data of the prior cache line when the offset descending is formed.

12. The apparatus of claim 9, wherein the detector comprises:
a cache-line detection unit, coupled to the first LD/ST queue and the second LD/ST queue, determining whether the first cache-line number and the second cache-line number equal the third cache-line number;
an offset detection unit, coupled to the first LD/ST queue and the second LD/ST queue, determining whether the first offset is greater than the third offset and determining whether the second offset is greater than the third offset; and
a trend detection unit, coupled to the cache-line detection unit and the offset detection unit, determining whether an offset trend is formed according to the determinations by the cache-line detection unit and the offset detection unit, and directing the L1 data cache to prefetch data of the cache line when the offset trend is formed.

13. The apparatus of claim 12, wherein the trend detection unit determines that an offset trend is formed when the cache-line detection unit determines that the first cache-line number and the second cache-line number equal the third cache-line number, and the offset detection unit determines that the first and second offsets are different and greater than the third offset.

14. The apparatus of claim 12, wherein the trend detection unit determines that an offset trend is formed when the cache-line detection unit determines that the first cache-line number and the second cache-line number equal the third cache-line number, and the offset detection unit determines that the first and second offsets are different and less than the third offset.

15. The apparatus of claim 12, wherein the trend detection unit comprises:
a data refresh circuit, coupled to the cache-line detection unit and the offset detection unit, determining whether the offset trend is formed according to the determinations by the cache-line detection unit and the offset detection unit; and
a prefetch triggering circuit, directing the L1 data cache to prefetch data of the cache line when the offset trend is formed.

16. The apparatus of claim 15, wherein the data refresh circuit comprises a first trend counter, a value of the first trend counter is increased by one when the first cache-line number equals the third cache-line number and the first offset is greater than the third offset, the value of the first trend counter is increased by one when the second cache-line number equals the third cache-line number and the second offset is greater than the third offset, the data refresh circuit determines that an offset ascending is formed when the value of the first trend counter is greater than a first threshold, and the prefetch triggering circuit directs the L1 data cache to prefetch data of the next cache line when the offset ascending is formed.

17. The apparatus of claim 15, wherein the data refresh circuit comprises a second trend counter, a count of the second trend counter is increased by one when the first cache-line number equals the third cache-line number and the first offset is less than the third offset, the count of the second trend counter is increased by one when the second cache-line number equals the third cache-line number and the second offset is less than the third offset, the data refresh circuit determines that an offset descending is formed when the count of the second trend counter is greater than a second threshold, and the prefetch triggering circuit directs the L1 data cache to prefetch data of the prior cache line when the offset descending is formed.

18. The apparatus of claim 9, comprising:

a plurality of detectors, wherein the detectors correspond to different third cache-line numbers.

19. The apparatus of claim 18, comprising:

a detection controller, selecting the detector with the oldest third cache-line number when the first cache-line number or the second cache-line number is different from all third cache-line numbers of the detectors, and updating the third cache-line number of the selected detector with the first cache-line number or the second cache-line number.

20. The apparatus of claim 9, wherein the detector obtains a fourth offset from another offset register, and the third offset and the fourth offset correspond to read requests with the same cache-line number and dispatched respectively from the first and second LD/ST queues at a clock cycle before a current clock cycle.

* * * * *